(12) United States Patent
Kasper et al.

(10) Patent No.: US 11,211,854 B2
(45) Date of Patent: Dec. 28, 2021

(54) ELECTRICAL MACHINE

(71) Applicant: OTTO-VON-GUERICKE-UNIVERSITAT MAGDEBURG, Magdeburg (DE)

(72) Inventors: Roland Kasper, Samswegen (DE); Norman Borchardt, Magdeburg (DE)

(73) Assignee: OTTO-VON-GUERICKE-UNIVERSITAT MAGDEBURG, Magdeburg (DE)

( * ) Notice: Subject to any disclaimer, the term of this patent is extended or adjusted under 35 U.S.C. 154(b) by 396 days.

(21) Appl. No.: 16/066,560

(22) PCT Filed: Jan. 18, 2017

(86) PCT No.: PCT/EP2017/050949
§ 371 (c)(1),
(2) Date: Dec. 22, 2018

(87) PCT Pub. No.: WO2017/125416
PCT Pub. Date: Jul. 27, 2017

(65) Prior Publication Data
US 2019/0115814 A1 Apr. 18, 2019

(30) Foreign Application Priority Data
Jan. 18, 2016 (DE) .......................... 102016100744.7

(51) Int. Cl.
*H02K 21/22* (2006.01)
*H02K 21/16* (2006.01)
(Continued)

(52) U.S. Cl.
CPC .............. *H02K 21/22* (2013.01); *H02K 3/04* (2013.01); *H02K 3/12* (2013.01); *H02K 3/28* (2013.01);
(Continued)

(58) Field of Classification Search
CPC .. H02K 3/04; H02K 3/47; H02K 3/12; H02K 21/22; H02K 15/02; H02K 21/16; H02K 3/16; H02K 3/20
(Continued)

(56) References Cited

U.S. PATENT DOCUMENTS 2,925,503 A * 2/1960 Efromson .............. H02K 33/18
310/27
5,015,622 A * 5/1991 Ward et al.
(Continued)

FOREIGN PATENT DOCUMENTS

DE 58011 C 8/1891
DE 3433695 C2 4/1992
(Continued)

OTHER PUBLICATIONS

Shikayama (JP 11041870 A) English Translation (Year: 1999).*
(Continued)

*Primary Examiner* — Tulsidas C Patel
*Assistant Examiner* — Robert E Mates
(74) *Attorney, Agent, or Firm* — Barlow, Josephs & Holmes, Ltd.; Stephen J. Holmes

(57) ABSTRACT

An electrical machine has a primary part, a secondary part and an air gap in which an air gap winding with two phases is arranged on an iron core of the primary part. Magnetic poles alternate on an iron core of the secondary part. A magnetic circuit runs via two poles, the iron core in the secondary part, twice through the air gap and the iron core in the primary part. For each pole and phase, a winding strand lies perpendicular to a magnetic flux density in the air gap. Alternating head pieces connect neighbouring winding strands of a phase of the air gap winding to form a conductor. The primary part has a slot winding with two phases in slots of the iron core. For each pole and each phase, a winding
(Continued)

strand lies parallel to the winding strand of the air gap winding associated with the same pole.

16 Claims, 8 Drawing Sheets

(51) Int. Cl.
*H02K 3/04* (2006.01)
*H02K 3/12* (2006.01)
*H02K 3/28* (2006.01)
*H02K 3/47* (2006.01)
*H02K 15/02* (2006.01)

(52) U.S. Cl.
CPC ............... *H02K 3/47* (2013.01); *H02K 15/02* (2013.01); *H02K 21/16* (2013.01)

(58) Field of Classification Search
USPC .......................... 310/12.19, 40 R, 184, 198
See application file for complete search history.

(56) References Cited

U.S. PATENT DOCUMENTS

| | | | | |
|---|---|---|---|---|
| 5,912,515 | A * | 6/1999 | Ackermann | ........... H02K 29/03 310/67 R |
| 5,990,591 | A * | 11/1999 | Yamaguchi | ........... H02K 1/276 310/12.18 |
| 2008/0258572 | A1 | 10/2008 | Koehler | |
| 2011/0050007 | A1 * | 3/2011 | Kubo | ..................... H02P 6/186 310/12.19 |
| 2011/0291599 | A1 * | 12/2011 | El-Antably et al. | |
| 2013/0063711 | A1 * | 3/2013 | Kochersperger | .... G03F 7/70825 355/71 |
| 2014/0009147 | A1 * | 1/2014 | Taniguchi | ........... H02K 1/2766 324/258 |
| 2014/0217846 | A1 * | 8/2014 | Kasper et al. | |

FOREIGN PATENT DOCUMENTS

| | | |
|---|---|---|
| DE | 19530918 A1 | 2/1997 |
| DE | 102011111352 B4 | 11/2015 |
| EP | 0668651 A1 | 8/1995 |
| JP | 10164788 A * | 6/1998 |
| JP | H10164788 A | 6/1998 |
| JP | 11041870 A * | 2/1999 |
| JP | H1141870 A | 2/1999 |
| JP | 2001025228 A * | 1/2001 |
| JP | 2001025228 A | 1/2001 |
| JP | 2013074728 A * | 4/2013 |
| JP | 2013074728 A | 4/2013 |
| JP | 2014525727 A | 9/2014 |
| JP | 2018537456 A | 12/2018 |

OTHER PUBLICATIONS

Shikayama (JP 10164788 A) English Translation (Year: 1998).*
Oishi (JP 2001025228 A) English Translation (Year: 2001).*
Satoshi (JP-2013074728-A) English Translation (Year: 2013).*

* cited by examiner

Figure 7:
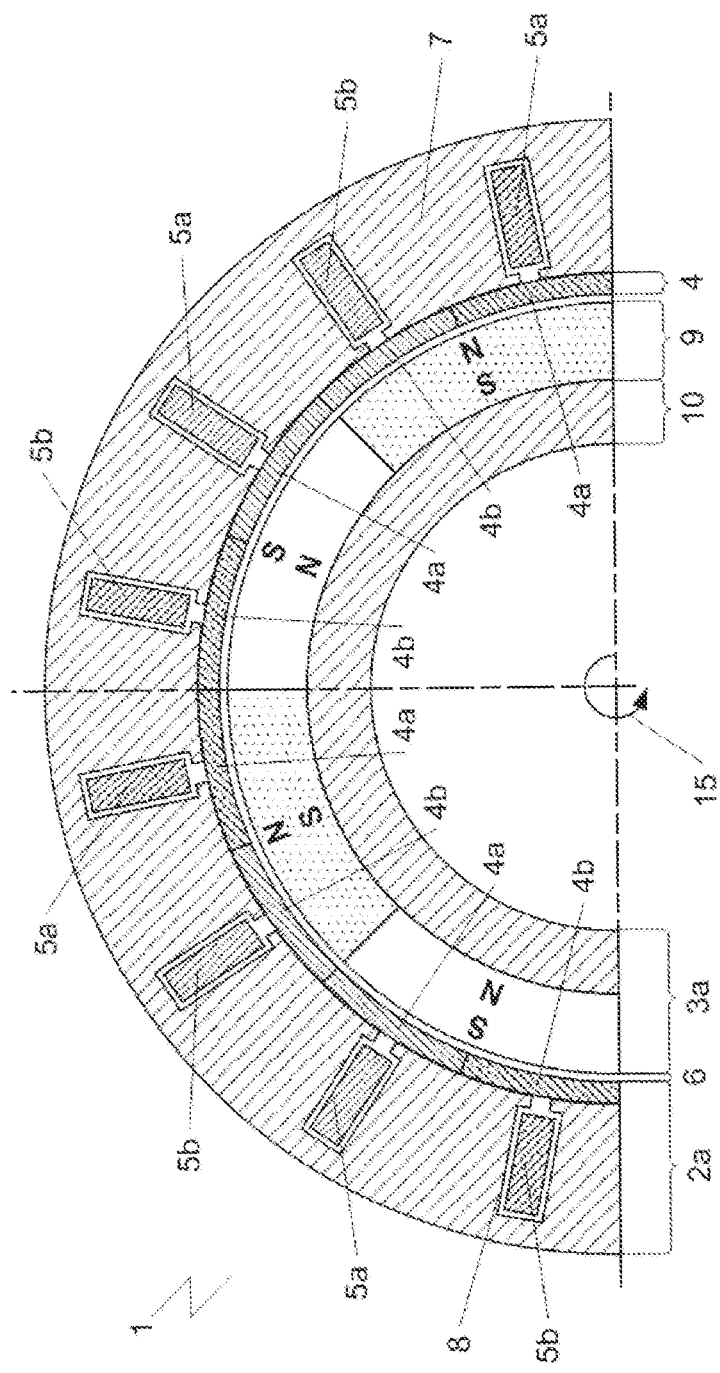

Figure 7    Internal Armature

ELECTRICAL MACHINE

The invention relates to an electrical machine having a primary part, a secondary part, an air gap between the primary part and the secondary part, an air gap winding in the air gap, said winding comprising at least two phases and being arranged directly on an iron core of the primary part, said machine also having magnetic poles which are arranged alternately on an iron core of the secondary part, a local magnetic circuit which is formed via a pair of the magnetic poles, the iron core in the secondary part, twice via the air gap between the two magnets of the pair of magnetic poles and the iron core in the primary part, wherein the air gap winding is arranged with respect to the magnetic poles in such a manner that a winding strand lies in the air gap for each magnetic pole and for each phase, namely, perpendicularly to a magnetic flux density in the air gap and also perpendicularly to a direction of movement, wherein mutually parallel, directly neighbouring winding strands of a phase of the air gap winding in the air gap are connected by head pieces which alternate at each side to form a respective conductor.

Electrical machines in the form of electric motors for example are well-known and enjoy constantly rising usage in many fields of application. A series of proposals for electrical machines of this type has already been conceived.

An armature arrangement for electrical machines has already been described in DE 58011 A. The rotor that is referred to as an armature comprises slots. Some winding strands are now arranged in the slots, whilst other winding strands are laid over the surface of the so-designated armature. A larger winding area for the winding is thereby created.

Furthermore for instance, an electric motor is disclosed in DE 34 33 695 C2 which comprises a stator and a rotor. The stator serving as a primary part is provided with a winding with two phases. The rotor serving as a secondary part is equipped with magnetic poles which are arranged alternately.

An electric motor described in DE 10 2011 111 352 B4 has turned out to be particularly effective and advantageous. It comprises a primary part in the form of a stator having a coil device with at least two phases. A secondary part possesses an even number of magnetic poles which are arranged alternately on the secondary part. A coil device is arranged in an air gap between the primary part and the secondary part. The coil device comprises at least two winding strands and at least one electrical connecting element. Winding strands are fixed on the primary part by means of the electrical connecting elements.

The magnetic field in the air gap is effective during each current-conveying phase and produces a Lorentz force.

A series of advantages result from the winding which is located in the air gap and is fixed directly on the stator and, in particular, has a meandering shape.

Nevertheless there is a wish to propose yet more improvements for electrical machines of this type.

The object of the invention is to propose an electrical machine which exhibits further possibilities compared with the electrical machine in accord with the first part of the main Claim.

In the case of an electrical machine in accord with the first part of the main Claim, this object is achieved by means of the invention in that there is provided an electrical machine, with a primary part having a first iron core, with a secondary part having a second iron core, with an air gap between the primary part and the secondary part, with an air gap winding in the air gap, which winding comprises at least two phases and is arranged directly on the first iron core of the primary part, with magnetic poles which are arranged alternately on the second iron core of the secondary part, with a respective local magnetic circuit which is formed by means of a pair of the magnetic poles, the iron core in the secondary part, twice through the air gap between the two magnets of the pair of magnetic poles and the iron core in the primary part, wherein the air gap winding is arranged relative to the magnetic poles in such a manner that, for each magnetic pole and for each phase, a respective winding strand lies in the air gap, namely, perpendicularly to a magnetic flux density in the air gap and also perpendicularly to a direction of movement of the secondary part, wherein mutually parallel, directly neighbouring winding strands of a phase of the air gap winding in the air gap are connected by head pieces which alternate at both ends to form a respective conductor and wherein the primary part is additionally provided with a slot winding, in that the slot winding comprises at least two phases and is arranged in slots of the iron core of the primary part, in that the slot winding is arranged relative to the magnetic poles in such a manner that, for the slot winding for each magnetic pole and for each phase, a respective winding strand parallel to the winding strand of the air gap winding that is associated with the same magnetic pole lies in the slot, in that mutually parallel, directly neighbouring winding strands of a phase of the slot winding in a slot are connected by head pieces which alternate at both ends to form a conductor, and in that the winding strands of the first phase of the air gap winding and the winding strands of the first phase of the slot winding exhibit a positional offset relative to each other which is determined by the numbers of phases and the air gap winding and the slot winding are operable by a control arrangement that is synchronized alternately to the position of the magnetic pole.

Firstly, such a conception exhibits all of the advantageous properties that are also already present in the case of the provision of a conception of an electrical machine with only one meandering air gap winding in the sense of this invention.

An iron core is to be understood as being a device consisting of high permeability materials of differing geometry and arrangement which serve for the feedback of the magnetic flux. Thereby, the iron core does not always have to be in the form of a solid iron body. In the primary part, it is usually implemented in the form of laminations for the purposes of reducing eddy currents. For the purposes of reducing the weight of the electrical machine, the iron core could also be e.g. a device which comprises an iron powder embedded in a synthetic material.

Thus, all the magnetic poles can be used at the same time for building up the force or torque thereby developing a large torque.

Only comparatively little iron is needed for the purposes of conveying the magnetic flux in the interior of the structure, something which can be utilised for producing a very light construction of the machine.

Moreover, due to the number of turns of 1 for the meandering air gap winding only comparatively little copper is needed, something which reduces costs and also leads to a lighter construction.

The direct application of the air gap winding to the stator can be exploited to achieve excellent cooling of the air gap winding. It is also possible hereby to transfer very high forces or torques.

In contrast thereto, the space required for the force-forming and torque-forming parts is quite small, whereby very compact machines become possible.

The construction in accordance with the invention also makes it possible to provide a construction of quite simple geometry for the electrical machine. The production costs can thereby be significantly reduced.

Since no noticeable region of field weakness arises, the electrical machine can also be used efficiently at high numbers of revolutions.

Due to the additional measures in accordance with the invention, then as a supplement to the meandering shape of the air gap winding, there is now proposed a second winding which is integrated into the primary part, i.e. preferably into the stator. Slots which are then used for the accommodation of a slot winding can be formed into the primary part i.e. into the stator. The performance and torque intensity can thereby be further increased.

This slot winding utilises the magnetic circuit that has already been built up in order to form additional forces and torques in a particularly effective manner. Hereby, the arrangement and the passage of current through the slot winding are selected in such a way that the effect of the air gap winding is affected as little as possible for a maximum power output of the slot winding. In this way, the forces and torques can be increased by 60 to 80% in comparison with a construction having only one air gap winding, as initial trials have already shown.

The potential for a lightweight construction of the electrical machine is also usable very effectively. By contrast with a conception without a slot winding, only the weight of the slot winding itself comes into consideration, further subassemblies on the part of the machine are not needed. The slot winding can preferably be implemented with a number of turns of 1 and thus also manages to get along with very little copper. However, a number of turns of >1 is envisaged in some embodiments.

Overall, there results from the invention an electrical machine having a magnetic circuit which uses two differently structured windings for the electromechanical conversion process. On the one hand, there is a meandering air gap winding which is located on the surface of the stator iron yoke, and, on the other hand, there is a slot winding which is located in slots that have been formed in the stator iron yoke. The two windings are interconnected and, together, they transform a total force or a total torque. Hereby, two electromechanical transforming principles come into play. The general Lorentz law of force for current-conveying electrical conductors in a magnetic field is applicable for the air gap winding and the magnetic force between the electromagnets formed in the stator or static member and the permanently excited or independently excited poles in the armature or rotor applies for the slot winding.

The electrical machines in accordance with the invention are very compact, light, efficient, dynamic and in particular have a very high torque.

The modification compared with a concept which has only one air gap winding leads only to a very small increase in manufacturing costs and is thus justified and effective in any case. In regard to the significantly increased torque and the significantly increased power with simultaneously a very small increase in weight, this manufacturing cost is in any case justified.

Furthermore, it is also of advantage that a very simple geometry and a compact construction are also provided by this modification.

Due to these characteristics, the electrical machines in accordance with the invention can be employed, in particular, in every field of application in which there is a particular dependency on these characteristics.

Amongst others, this also includes mobile drive systems such as electric vehicles in general for example, electric commercial motor vehicles, electric bicycles, electric scooters, electric boats, electric ships or electric aircraft. In all such fields of application, light electrical machines are of advantage and a compact construction is particularly desired since there is only a limited amount of space available.

Nonetheless, the electrical machines that have to be employed in such systems must be efficient and dynamic.

Moreover, electrical machines in accordance with the invention are very easily scalable. For this reason, a wider power range can be covered with suitably adapted dimensions.

It also an advantage inter alia, that cooling of the slot winding without any additional layout for apparatus can be effected by means of a cooling system that is already in regular use.

The characteristic advantages of the two types of windings being employed can be advantageously combined in operation. This is due inter alia to the fact that an air gap winding only causes a very small weakening of the field, whilst a slot winding can induce weakening of the field. Optimization of the system can be effected e.g. in regard to having maximum torque or else in regard to maximum efficiency in dependence upon the particular wish by virtue of the combination.

It is of advantage if the number of slots for the slot winding in the primary part and the number of magnetic poles in the secondary part is implemented in a ratio of greater than, smaller than or equal to one, and if the positional offset of the winding strands in the slots relative to the position of the winding strands in the air gap and also the control of the slot winding is adaptable to the selected ratio. Due to this concept, the electrical machine in accordance with the invention is even better adaptable to differing requirements.

One possibility for the practical employment of an electrical machine in accordance with the invention consists in that the primary part is a stator, that the secondary part is in the form of a rotor, that there is provided an axis which is in the form of a rotational axis, and that the secondary part is arranged on a primary part parallel to the axis.

A further possibility for a practical application arises when the primary part is a stator, the secondary part is in the form of an armature, when there is provided an axis which is in the form of a thrust axis, and the secondary part is arranged parallel to the primary part and both are arranged perpendicular to the axis.

It is thereby possible for the secondary part to be arranged within the primary part in the form of an internal armature or outside the primary part in the form of an external armature.

The magnetic poles can be permanent or externally excitable. Possibilities for application also arise as a result of the electrical machine in accordance with the invention being in the form of a direct current machine, wherein the air gap winding and the slot winding are controllable at the same time by means of a pulsed direct voltage or pulsed electrical direct voltage.

Another possibility is characterized in that the electrical machine is in the form of an alternating current machine and in that the air gap winding and the slot winding are controllable by means of an alternating voltage or electrical alternating voltage, wherein the alternating voltage being supplied exhibits a mutual phase shift.

Naturally, it is also possible for the electrical machine to be constructed in such a way that one of the two windings is controlled in direct current mode and the other one of the two windings in alternating current mode.

A particularly practical advantage arises if the primary part is in the form of a slotted solid cylinder or a slotted hollow cylinder. The primary part can thereby contain the two windings which in turn could have individual geometries.

Alternatively, it is also possible for the primary part to comprise at least one slotted cylinder or hollow cylinder segment and for the secondary part to be implemented as a hollow cylinder or hollow cylinder segment.

A particularly preferred embodiment of the invention consists in that the electrical connecting elements of the air gap winding and the electrical connecting elements of the slot winding are in connection with the winding strands in such a manner that they are arranged in alternating manner, preferably, in meandering form. The meandering shape has turned out to be particularly reliable, efficient and practicable.

Furthermore it is also possible for the electrical connecting elements of the air gap winding and the electrical connecting elements of the slot winding to be in connection with the winding strands in such a manner that spatially they are either arranged in the plane of the winding strands or at an optional angle to the plane of the direction of movement.

It is conceivable that the winding strands of the air gap winding and/or the winding strands of the slot winding are formed in single or multipart manner and have a cross section which is in the form of a rectangle, a square, a circle or a ring segment.

There are also different possibilities for the arrangement and orientation of the winding strands of the air gap windings and the winding strands of the slot winding.

Thereby, they can be aligned in parallel with the rotation axis and/or perpendicularly to the thrust axis. It is also possible to fix winding strands to the primary part by means of the electrical connecting elements and/or to form them in one-piece manner together with the electrical connecting elements.

The air gap winding and/or the slot winding itself could also be formed in one-piece manner together with the primary part.

In a further embodiment of the invention, the slot winding is implemented with a number of turns that is greater than 1.

Further features and advantageous concepts of the invention are indicated in the appendant Claims as well as in the following description of the Figures.

Figure 1:
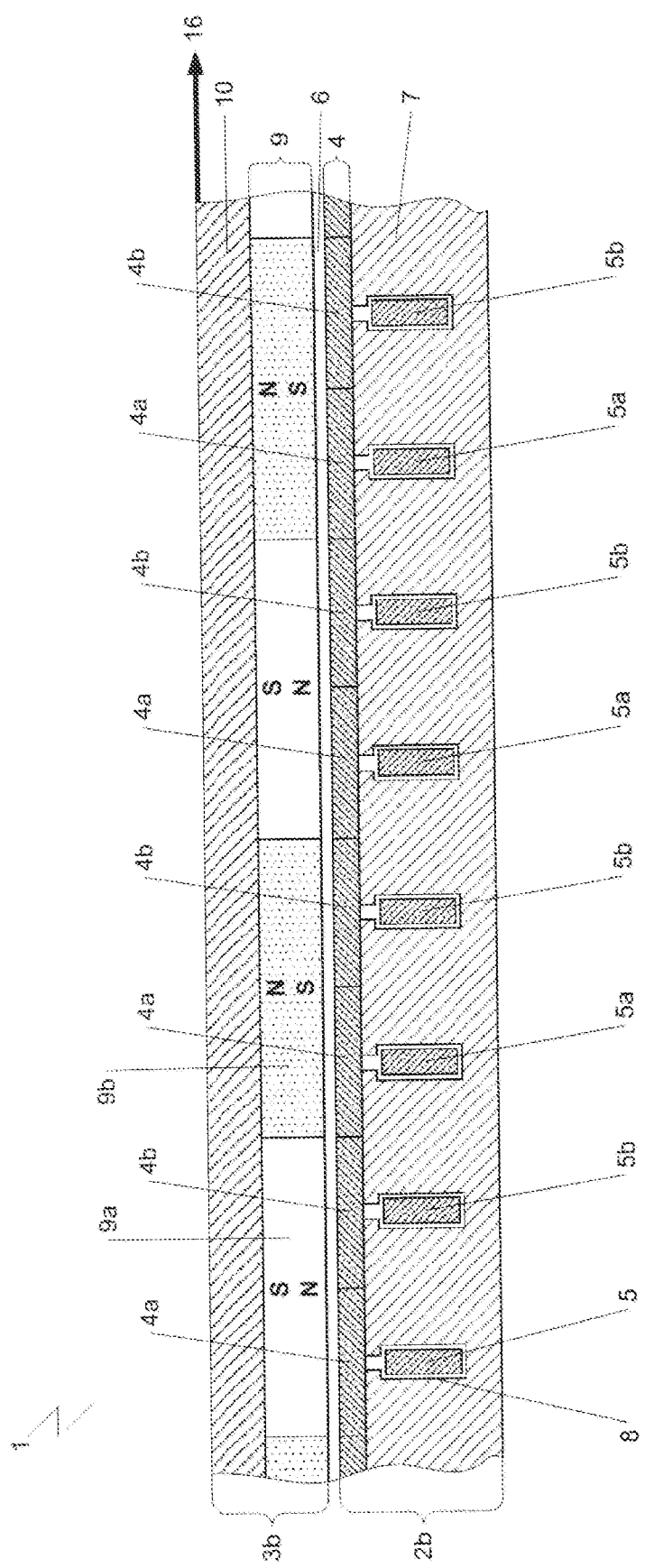
Figure 2:
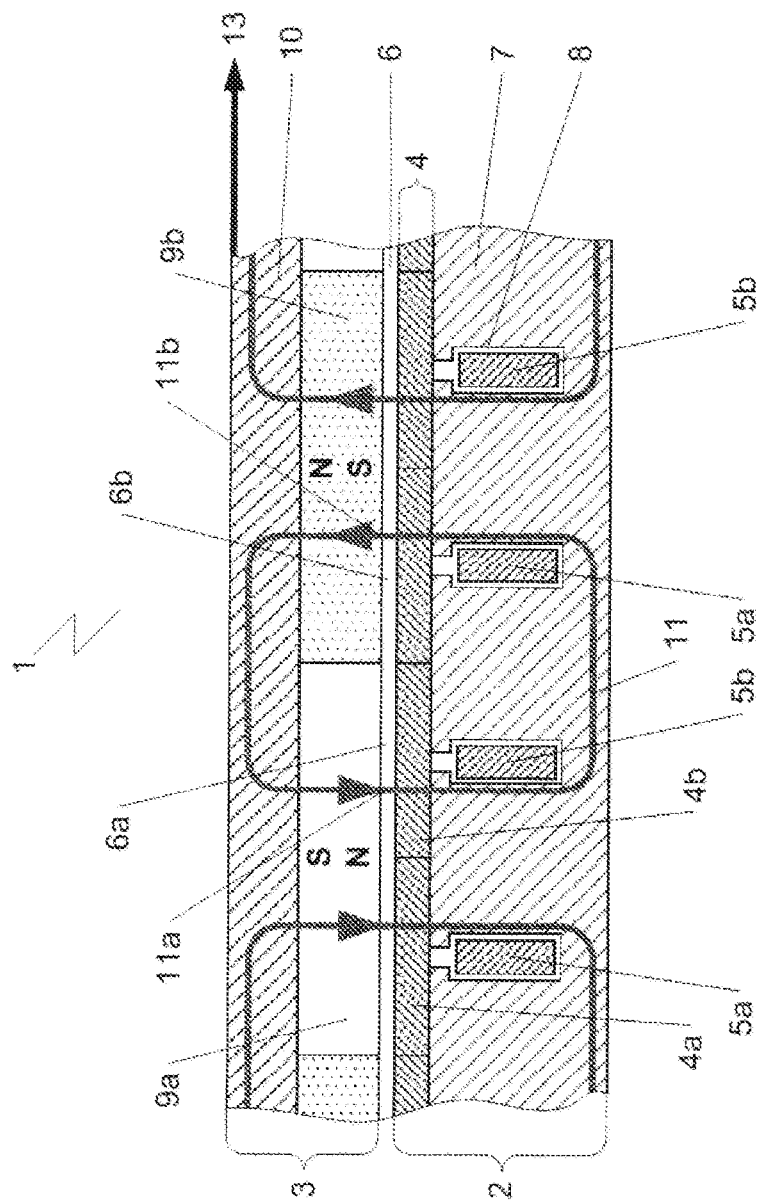
Figure 3:
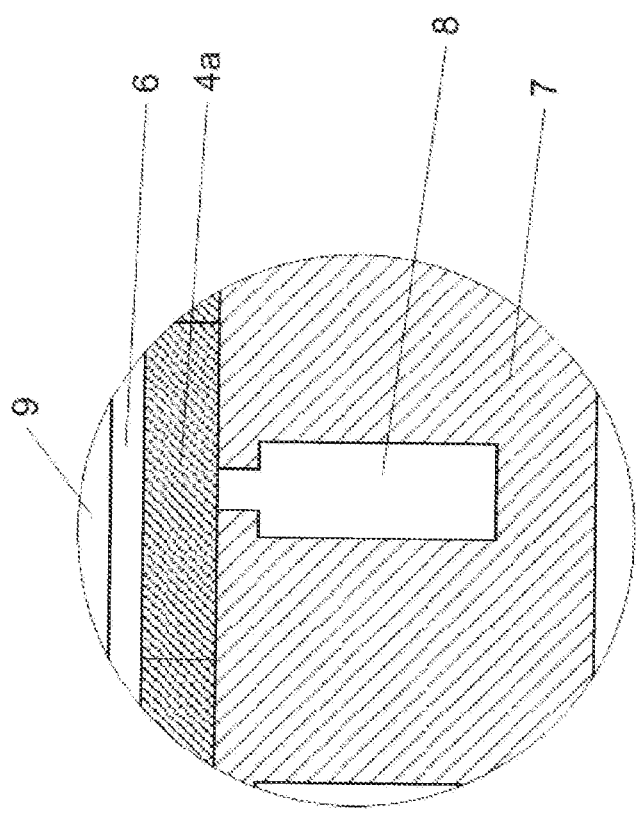
Figure 4:
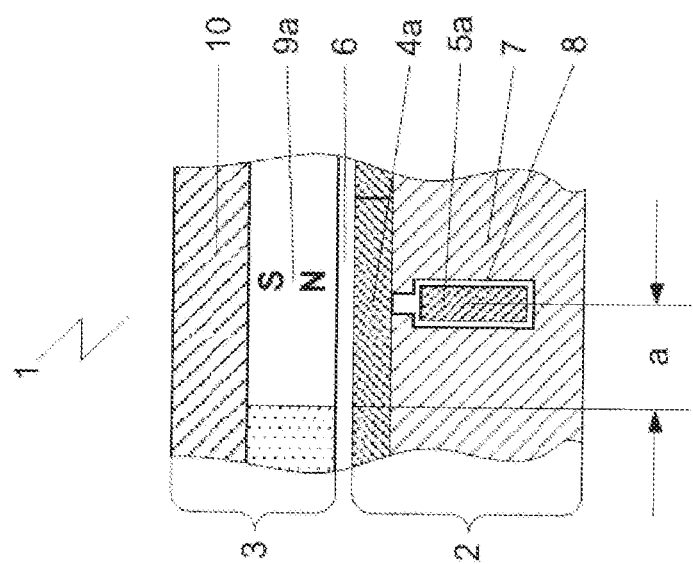
Figure 5:
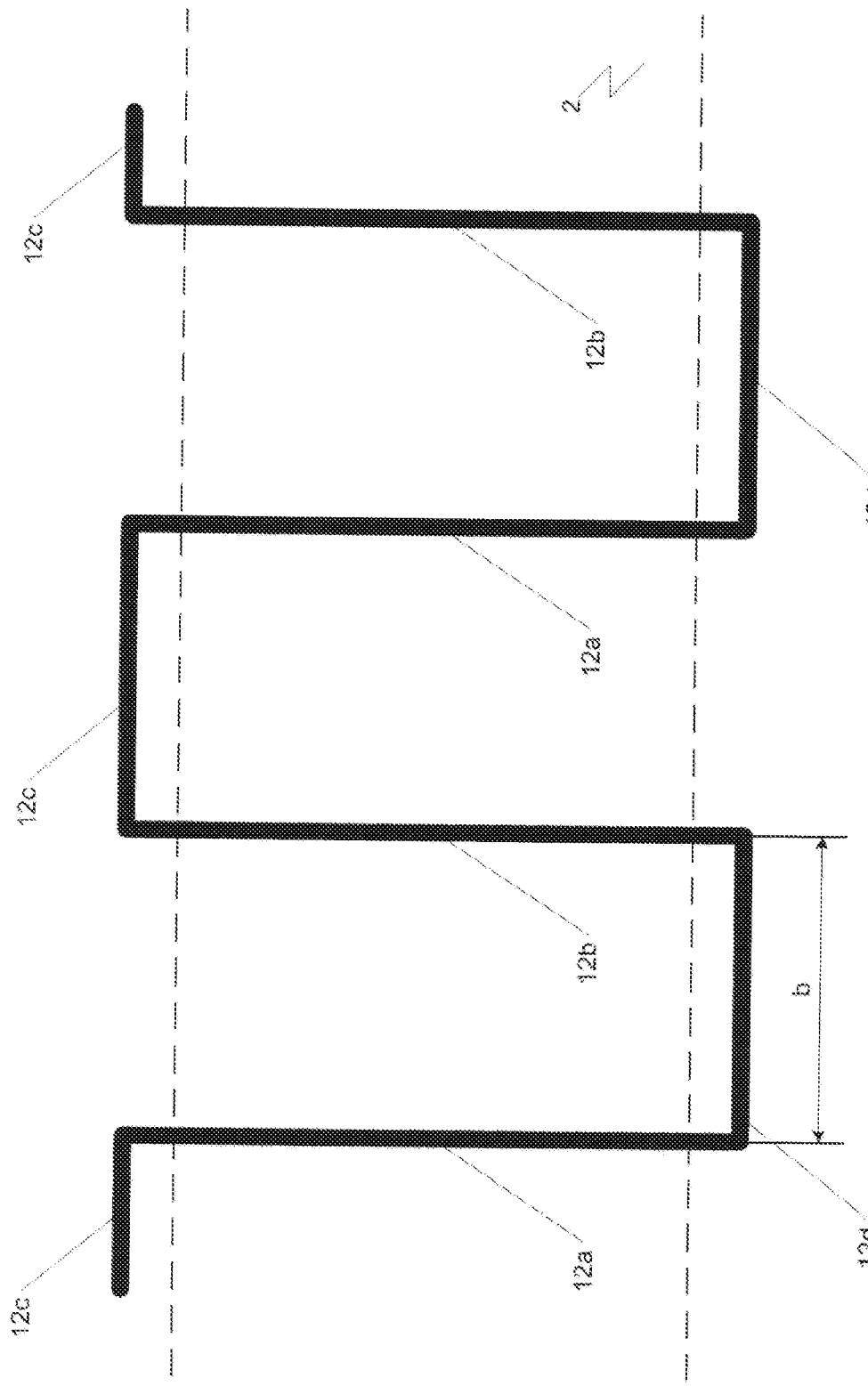
Figure 6:
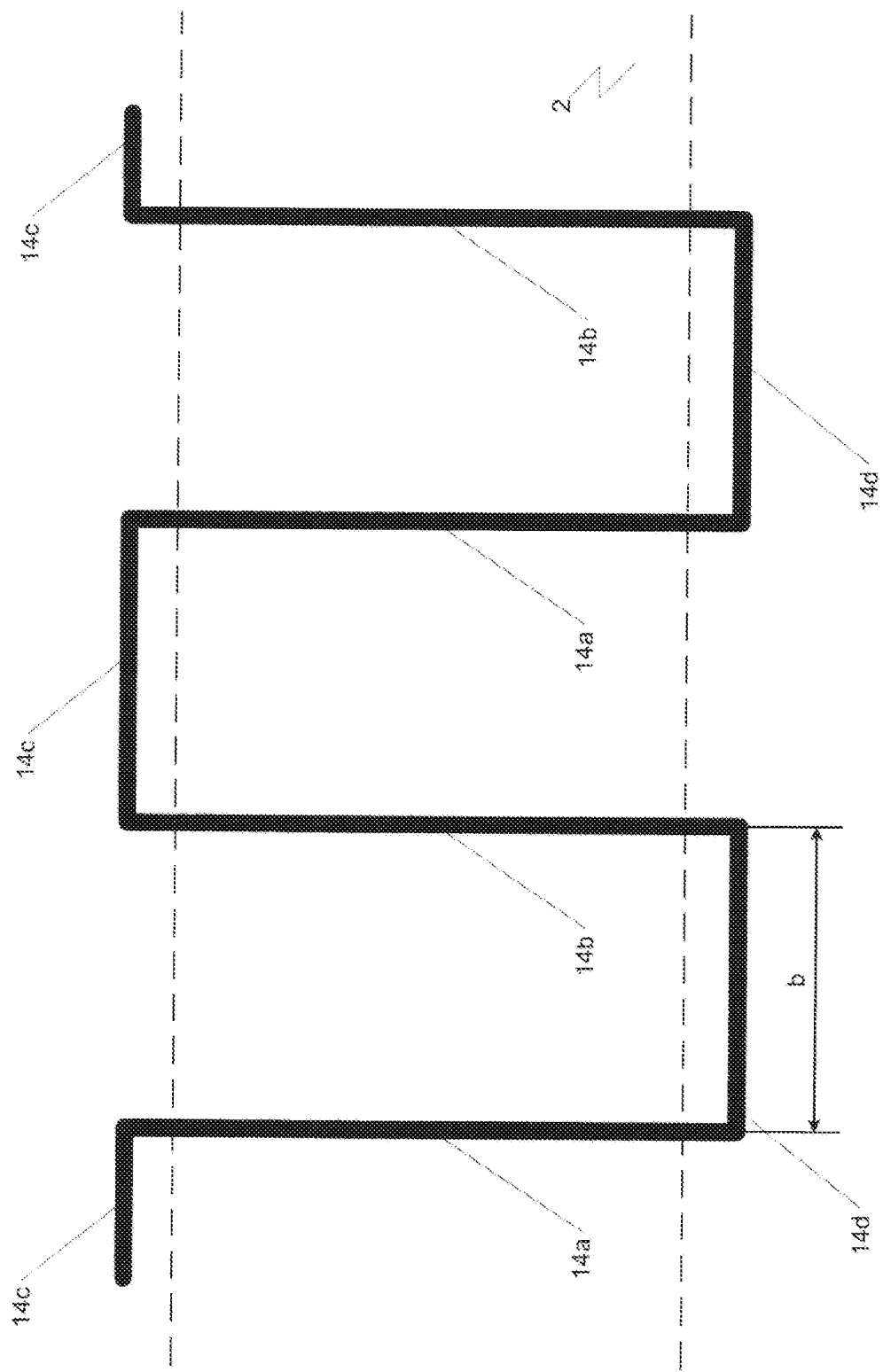
Figure 8:
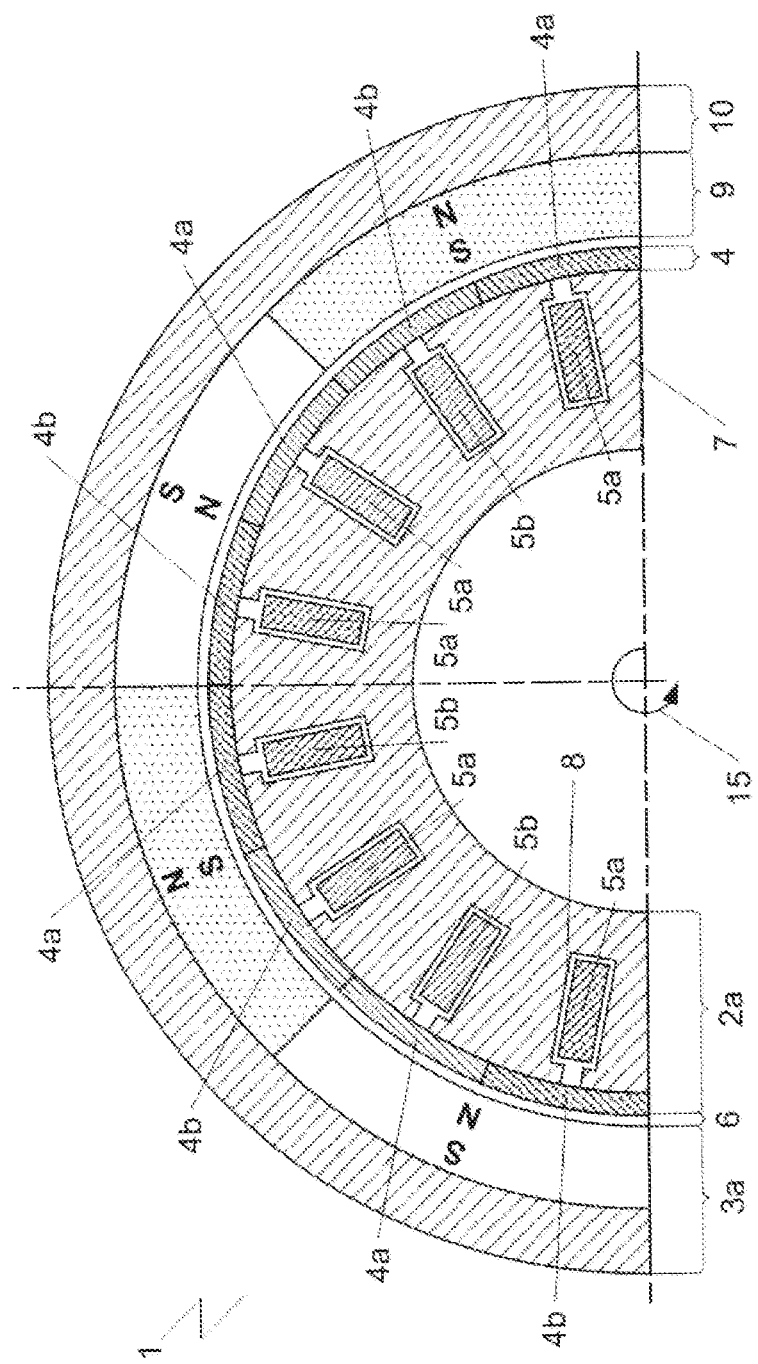

In the following, some exemplary embodiments of the invention are described in more detail with the aid of the drawings. Therein:

FIG. 1 shows a schematic section through a first embodiment of an electrical machine in accordance with the invention;

FIG. 2 a schematic section through a second embodiment of an electrical machine in accordance with the invention;

FIG. 3 an enlarged detail from the embodiments depicted in FIG. 1 or 2 with a section within the region of a slot;

FIG. 4 an enlarged detail from the embodiments depicted in FIG. 1 or 2 concerning the positional offset within the region of a slot;

FIG. 5 a schematic illustration of the shape of an air gap winding in one of the embodiments depicted in FIG. 1 or 2;

FIG. 6 a schematic illustration of the slot winding in one of the embodiments depicted in FIG. 1 or 2;

FIG. 7 a schematic section through a further embodiment of an electrical machine in accordance with the invention, here in the form of an internal armature; and FIG. 8 a schematic section through a fourth embodiment of an electrical machine in accordance with the invention, here in the form of an external armature.

FIG. 1 shows schematically the construction of a first embodiment of an electrical machine 1 in accordance with the invention. The electrical machine 1 possesses a primary part 2b and a secondary part 3b. The primary part 2b and the secondary part 3b are separated by an air gap 6.

Furthermore, an air gap winding 4 and a slot winding 5 are provided. In the case of the illustrated embodiment, this is a combined slot winding 5 and air gap winding 4 for a linear arrangement. The primary part 2b has an iron yoke in the form of an iron core 7, the slot winding 5 and the air gap winding 4. The iron core 7 or iron yoke of the electrical machine 1, i.e. here, a linear electrical machine, is a slotted stator. The iron core 7 therefore incorporates slots 8. In exemplary manner, a two-phase slot winding 5a, 5b is integrated/inserted into the slots 8 of the iron core 7 or iron yoke. Exemplarily, a two-phase air gap winding 4a, 4b is applied to the slotted surface of the iron core 7 or iron yoke.

The secondary part 3b of the electrical machine 1 or linear machine is an armature. This comprises an iron core 10 or iron yoke and permanently excited magnetic poles 9. The latter are arranged on the surface of the iron core 10 or iron yoke with alternating polarization. The polarization of the permanently excited magnetic poles 9 in this embodiment is defined by N for a north pole and S for a south pole. The secondary part 3b can vary its position along an axis, here a thrust axis 16.

An embodiment of the electrical machine 1 in accordance with the invention which combines two phases 5a, 5b of a slot winding 5 and two phases 4a, 4b of an air gap winding 4 is illustrated schematically in the form of an enlarged illustration in FIG. 2.

Here, a magnetic circuit 11 is highlighted for the purposes of elucidation. This magnetic circuit 11 extends via the iron yoke or iron core 7, the two phases 4a, 4b of the air gap winding 4, a first magnetically effective air gap 6a, a second magnetically effective air gap 6b which is located in the air gap 6 that is traversed twice by the magnetic circuit 11, the magnetic poles 9a, 9b and the iron yoke or iron core 10 of the secondary part 3b.

The orientation of a magnetic flux density within the air gap 6 for the magnetic circuit 11 is illustrated by the two sections 11a, 11b.

Moreover, an embodiment is illustrated in FIG. 2 in which the iron core 7 or iron yoke of the primary part 2 is slotted. In exemplary manner, a slot winding 5 having two phases 5a, 5b is integrated or inserted into the slots 8 that were formed therein. Exemplarily, an air gap winding 4 which likewise has two phases 4a, 4b is applied to the slotted surface of the iron yoke or iron core 7 of the primary part 2.

The secondary part 3 is represented by the iron yoke or iron core 10 and the two magnetic poles 9a, 9b which are permanently excited in this embodiment. The magnetic poles 9a, 9b are arranged on the surface of the iron core 10 with alternating polarization. The polarization of the permanently excited magnetic poles 9 is defined by N for a north pole and S for a south pole. The secondary part 3 can vary its position along a direction of movement 13.

A detail view of a section of an electrical machine 1 which corresponds to the embodiments depicted in FIG. 1 or 2 for example is shown schematically in the enlarged illustration of FIG. 3. In particular, the detail view shows a slot 8 in the iron core 7 or iron yoke of the primary part 2b. The geometry of the slot 8 that is illustrated specifically herein is only one of numerous possible embodiments. Moreover, FIG. 3 shows a winding strand of the phase 4a of the air gap winding 4. One can readily perceive the air gap 6 between the magnetic pole 9 of the secondary part 3b and the primary part 2b.

A positional offset a between the phase 5a of the slot winding 5 in the slot 8 and the phase 4a of the air gap winding 4 can be perceived in a further detail illustration in enlarged form in FIG. 4, wherein this illustration can likewise refer to the embodiments depicted in FIG. 1 or 2. Moreover, FIG. 4 shows the primary part 2 and the secondary part 3 of the electrical machine 1. The iron core 7 or iron yoke, the slot 8, a winding strand of the phase 5a of the slot winding 5 and a winding strand of the phase 4a of the slot winding 4 are depicted in the primary part 2. The iron core 10 or iron yoke and the magnetic pole 9a are depicted In the secondary part 3. Here too, one can see the air gap 6 between the primary part 2 and the secondary part 3.

FIG. 5 shows schematically the path followed by the air gap winding 4 on the primary part 2. The air gap winding 4 consists of the winding strands 12a, 12b and alternating head pieces 12c, 12d. A width b denotes the width of a magnetic pole 9. The head pieces 12c, 12d are located outside the air gap 6 and are connected alternately to the winding strands 12a, 12b of the air gap winding 4 which is located within the air gap 6.

FIG. 6 shows schematically the path followed by the slot winding 5 on the primary part 2. The slot winding 5 consists of winding strands 14a, 14b and alternating head pieces 14c, 14d. The width b again denotes the width of a magnetic pole 9. The head pieces 14c, 14d are connected alternately to the winding strands 14a, 14b of the slot winding 4 which is located in the slots 8 of the primary part 2.

FIG. 7 shows schematically the construction of a further embodiment of an electrical machine 1 in accordance with the invention. The electrical machine 1 possesses a primary part 2b and a secondary part 3b. The primary part 2b and the secondary part 3b are separated from each other by an air gap 6.

Furthermore, an air gap winding 4 and a slot winding 5 are provided. In the case of the illustrated embodiment, this is a combined slot winding 5 and air gap winding 4 for a rotary electrical machine. The primary part 2a comprises an iron yoke in the form of an iron core 7, the slot winding 5 and the air gap winding 4. The iron core 7 or iron yoke of the electrical machine 1, i.e. here, a rotary electrical machine, is a slotted stator. The iron core 7 therefore incorporates slots 8. In exemplary manner, a two-phase slot winding 5a, 5b is integrated/inserted into the slots 8 of the iron core 7 or iron yoke. Exemplarily, a two-phase air gap winding 4a, 4b is applied to the slotted surface of the iron core 7 or iron yoke.

The secondary part 3a of the electrical machine 1 or rotary machine is a rotor. This comprises an iron core 10 or iron yoke and permanently excited magnetic poles 9. The latter are arranged on the surface of the iron core 10 or iron yoke with alternating polarization. The polarization of the permanently excited magnetic poles 9 in this embodiment is defined by N for a north pole and S for a south pole. As a rotor, the secondary part 3b can rotate about an axis, here, a rotational axis 15. Hereby, an embodiment in the form of an internal armature is illustrated in FIG. 7.

A fourth embodiment of an electrical machine 1 is illustrated in FIG. 8. The embodiment corresponds in regard to the majority of the illustrated elements to the embodiment depicted in FIG. 7. The embodiment in FIG. 8 differs from the embodiment in FIG. 7 in that there is shown a rotary electrical machine having a stator as the primary part 2a and a rotor as the secondary part 3a which together form an external armature.

LIST OF REFERENCE SYMBOLS 1 electrical machine
2 primary part
2a stator
2b stator
3 secondary part
3a rotor
3b armature
4 air gap winding
4a, 4b phases of the air gap winding
5 slot winding
5a, 5b phases of the slot winding
6 air gap
6a, 6b air gaps of the magnetic circuit
7 iron core of the primary part 2
8 slots
9 magnetic poles
9a, 9b pair of magnetic poles
10 iron core of the secondary part 3
11 magnetic circuit
11a, 11b magnetic flux density in the air gap
12a, 12b winding strand of air gap winding
12c, 12d alternating head piece of air gap winding
13 direction of movement
14a, 14b winding strand of slot winding
14c, 14d alternating head piece of slot winding
15 rotational axis
16 thrust axis
a positional offset
b width of a magnetic pole 9
N north pole
S south pole

The invention claimed is:
1. An electrical machine (1),
having a primary part (2) comprising a first iron core (7),
having a secondary part (3) comprising a second iron core (10),
having an air gap (6) between the primary part (2) and the secondary part (3),
having an air gap winding (4) in the air gap (6), which winding comprises at least two phases (4a, 4b) and is arranged directly on the first iron core (7) of the primary part (2), and wherein each respective phase (4a) directly abuts an adjacent alternating phase (4b),
having magnetic poles (9) which are arranged alternately on the second iron core (10) of the secondary part (3),
having a respective local magnetic circuit (11) which is formed by means of a pair of the magnetic poles (9a, 9b), the second iron core (10) in the secondary part (3), twice through the air gap (6) between two magnets of the pair of magnetic poles (9a, 9b) and the first iron core (7) in the primary part (2),
wherein the air gap winding (4) is arranged relative to the magnetic poles (9) in such a manner that, for each magnetic pole (9) and for each phase (4a, 4b), a respective winding strand (12a, 12b) lies in the air gap (6), namely, perpendicularly to a magnetic flux density (11a, 11b) in the air gap (6) and also perpendicularly to a direction of movement (13) of the secondary part (3), wherein mutually parallel, directly neighbouring winding strands (12a, 12b) of a phase (4a, 4b) of the air gap winding (4) in the air gap (6) are connected by head pieces (12c, 12d) which alternate at both ends to form a respective conductor, wherein the primary part (2) is provided additionally with a slot winding (5), wherein the slot winding (5) comprises at least two phases (5a, 5b), each phase being separately and alternately arranged in a respectively spaced slot of a plurality of slots (8) of the first iron core (7) of the primary part (2), wherein the slot winding (5) is arranged relative to the magnetic poles (9) in such a manner that, for the slot winding (5) for each magnetic pole (9a, 9b) and for each phase (5a, 5b), a respective winding strand (14a, 14b) parallel to the winding strand (12a, 12b) of the air gap winding (4) that is associated with the same magnetic pole (9a, 9b) lies in the slot (8), wherein mutually parallel, directly neighbouring winding strands (14a, 14b) of a phase (5a, 5b) of the slot winding (5) in a slot (8) are connected by head pieces (14c, 14d) which alternate at both ends to form a respective conductor, and wherein the winding strands (12a, 12b) of the first phase (4a) of the air gap winding (4) and the winding strands (14a, 14b) of the first phase (5a) of the slot winding (5) exhibit a positional offset (a) relative to each other which is determined by the number of phases and the air gap winding (4) and the slot winding (5) are operable by a control arrangement that is synchronized alternately to a position of the magnetic pole (9).

2. An electrical machine (1) in accordance with claim 1, characterized in that a number of slots (8) of the slot winding (5) in the primary part (2) and a number of magnetic poles (9) in the secondary part (3) is implemented in a selected ratio that is greater than, smaller than or equal to one, and in that the positional offset (a) of the winding strands (14a, 14b) in the slots (8) relative to a position of the winding strands (12a, 12b) in the air gap (6) as well as the control of the slot winding (5) is adaptable in correspondence with the selected ratio.

3. An electrical machine (1) in accordance with claim 1, characterized in that the primary part (2) is a stator (2a), that the secondary part (3) is in the form of a rotor (3a), that an axis (15) is provided which is a rotational axis, and in that the secondary part (3) and the primary part (2) are arranged parallel to the axis (15).

4. An electrical machine (1) in accordance with claim 1, characterized in that the primary part is a stator (2b), that the secondary part is in the form of an armature (3b), that an axis (16) is provided which is a thrust axis, and that the secondary part (3) is parallel to the primary part (2b) and both are arranged perpendicularly to the axis (16).

5. An electrical machine (1) in accordance with claim 4, characterized in that the secondary part (3) is arranged within the primary part (2) as an internal armature or outside the primary part (2) as an external armature.

6. An electrical machine (1) in accordance with claim 1, characterized in that the magnetic poles (9) are permanent or externally excitable.

7. An electrical machine (1) in accordance with claim 1, characterized by its construction as a direct current machine and in that the air gap winding (4) and the slot winding (5) are controllable simultaneously by a pulsed direct voltage.

8. An electrical machine (1) in accordance with claim 1, characterized by its construction as an alternating current machine and in that the air gap winding (4) and the slot winding (5) are controllable by an alternating voltage, wherein the respectively supplied alternating voltages have a mutual phase shift.

9. An electrical machine (1) in accordance with claim 1, characterized in that one of the air gap winding and the slot winding (4 or 5) is controlled in a direct current mode of operation and the other one of the air gap winding and the slot winding (4 or 5) is controlled in an alternating current mode of operation.

10. An electrical machine (1) in accordance with claim 1, characterized in that the primary part (2) is in the form of a slotted solid cylinder or a slotted hollow cylinder.

11. An electrical machine (1) in accordance with claim 1, characterized in that the primary part (2) comprises at least one slotted cylinder segment or hollow cylinder segment and that the secondary part (3) is implemented as a hollow cylinder or hollow cylinder segment.

12. An electrical machine (1) in accordance with claim 1, characterized in that electrical connecting elements (12c, 2d) of the air gap winding (4) and electrical connecting elements (14c, 14d) of the slot winding (5) are connected to the winding strands (12a, 12b; 14a, 14b) in such a manner that the air gap winding (4) and the slot winding (5) are arranged in alternating manner, preferably in meandering form.

13. An electrical machine (1) in accordance with claim 1, characterized in that electrical connecting elements (12c, 12d) of the air gap winding (4) and electrical connecting elements (14c, 14d) of the slot winding (5) are connected to the winding strands (12a, 12b; 14a, 14b) in such a manner that the air gap winding (4) and the slot winding (5) are either arranged spatially in a plane of the winding strands or at an optional angle to a plane of the direction of movement.

14. An electrical machine (1) in accordance with claim 1, characterized in that the winding strands (12a, 12b) of the air gap winding (4) and the winding strands (14a, 14b) of the slot winding (5) are formed in one or multiple parts and have a cross section which is in a form of a rectangle, a square, a circle or a ring segment.

15. An electrical machine (1) in accordance with claim 1, characterized in that the winding strands (12a, 12b) of the air gap winding (4) and the winding strands (14a, 14b) of the slot winding (5) are oriented parallel to a rotational axis (15) and/or perpendicularly to a thrust axis (16) and/or are fixed to the primary part (2) by means of electrical connecting elements (12c, 12s, 14c, 14d) and/or are formed in one-piece together with electrical connecting elements (12c, 12d, 14c, 14d).

16. An electrical machine (1) in accordance with claim 1, characterized in
that the slot winding (5) is implemented with a number of turns greater than 1.

* * * * *